United States Patent
Oyobe et al.

(10) Patent No.: US 9,184,681 B2
(45) Date of Patent: Nov. 10, 2015

(54) VEHICLE INCLUDING MOTOR CONTROL DEVICE, AND CONTROL METHOD FOR VEHICLE

(71) Applicants: Hichirosai Oyobe, Toyota (JP);
Tetsutaka Yamamoto, Okazaki (JP);
Hiroyuki Oyanagi, Toyota (JP)

(72) Inventors: Hichirosai Oyobe, Toyota (JP);
Tetsutaka Yamamoto, Okazaki (JP);
Hiroyuki Oyanagi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 13/964,640

(22) Filed: Aug. 12, 2013

(65) Prior Publication Data
US 2014/0062359 A1 Mar. 6, 2014

(30) Foreign Application Priority Data
Aug. 29, 2012 (JP) ................ 2012-188580

(51) Int. Cl.
| H03K 5/00 | (2006.01) |
|---|---|
| H02P 6/14 | (2006.01) |
| H02P 6/08 | (2006.01) |
| H02P 21/00 | (2006.01) |

(52) U.S. Cl.
CPC ........ *H02P 6/142* (2013.01); *H02P 6/08* (2013.01); *H02P 21/0025* (2013.01)

(58) Field of Classification Search
CPC ....................................................... H02P 6/142
USPC .......................................................... 318/400.13
See application file for complete search history.

(56) References Cited

U.S. PATENT DOCUMENTS

| 2005/0104551 | A1 | 5/2005 | Nishimura et al. |
|---|---|---|---|
| 2008/0281480 | A1 | 11/2008 | Egami et al. |
| 2009/0237018 | A1* | 9/2009 | Nakagawa et al. ...... 318/400.04 |
| 2010/0001671 | A1 | 1/2010 | Yamada et al. |
| 2010/0052518 | A1* | 3/2010 | Jeon et al. ...................... 313/504 |
| 2010/0250181 | A1* | 9/2010 | Nakagawa et al. ............ 702/105 |

FOREIGN PATENT DOCUMENTS

| CN | 101803158 A | 8/2010 |
|---|---|---|
| JP | A-11-308888 | 11/1999 |
| JP | A-2004-266935 | 9/2004 |
| JP | A-2008-283751 | 11/2008 |
| JP | A-2009-60752 | 3/2009 |
| JP | A-2010-017020 | 1/2010 |
| JP | A-2010-187506 | 8/2010 |
| JP | A-2011-240903 | 12/2011 |

* cited by examiner

*Primary Examiner* — Erick Glass
(74) *Attorney, Agent, or Firm* — Oliff PLC

(57) ABSTRACT

A vehicle, including a motor having a rotor, a resolver that detects a rotation angle of the rotor and a control device, and a control method for the vehicle are provided. The control device executes rectangular-wave control over the motor using the rotation angle of the rotor, detected by the resolver, executes zero learning for learning a deviation between an origin of an actual rotation angle of the rotor and an origin of the detected rotation angle of the rotor, corrects the detected rotation angle of the rotor on the basis of a result of the zero learning, and, when the zero learning has not been completed yet, executes avoidance control for avoiding a rapid variation in output of the motor.

16 Claims, 12 Drawing Sheets

FIG. 2

| CONTROL | PWM CONTROL MODE | | RECTANGULAR-WAVE VOLTAGE CONTROL MODE |
|---|---|---|---|
| | SINUSOIDAL PWM | OVER-MODULATION PWM | RECTANGULAR WAVE (ONE PULSE) |
| OUTPUT VOLTAGE WAVEFORM OF INVERTER | FUNDAMENTAL-WAVE COMPONENT | FUNDAMENTAL-WAVE COMPONENT | FUNDAMENTAL-WAVE COMPONENT |
| MODULATION FACTOR | 0~0.61 | 0.61~0.78 | 0.78 |
| CHARAC-TERISTIC | SMALL TORQUE FLUCTUATIONS | IMPROVEMENT OF OUTPUT IN INTERMEDIATE-SPEED RANGE | IMPROVEMENT OF OUTPUT IN HIGH-SPEED RANGE |

FIG. 3

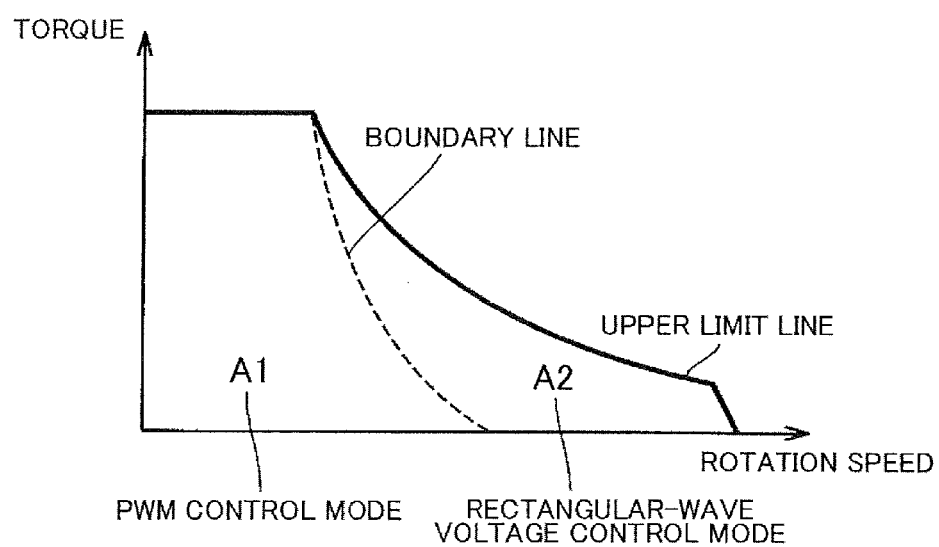

VEHICLE INCLUDING MOTOR CONTROL DEVICE, AND CONTROL METHOD FOR VEHICLE

INCORPORATION BY REFERENCE

The disclosure of Japanese Patent Application No. 2012-188580 filed on Aug. 29, 2012 including the specification, drawings and abstract is incorporated herein by reference in its entirety.

BACKGROUND OF THE INVENTION

1. Field of the Invention

The invention relates to a vehicle including a control device that executes rectangular-wave control (rectangular-wave voltage control) over a motor using an output of a resolver, and a control method for the vehicle.

2. Description of Related Art

Japanese Patent Application Publication No. 2008-283751 (JP 2008-283751 A) describes a technique for, in a system that drives a motor in a rectangular-wave control mode, preventing disturbing torque fluctuations by computing a motor command current vector and a motor detected current vector for torque control on the basis of a rotor rotation position detected by a rotor rotation position sensor and then correcting the phase of a rectangular-wave voltage such that a deviation between an estimated torque obtained from the motor command current vector and an estimated torque obtained from the motor detected current vector becomes zero.

Incidentally, a sensor called resolver is generally used for the sensor that detects a rotor rotation position, and a detected value of the resolver may include a so-called zero offset error. Therefore, it is desirable that control for calculating the zero offset error (hereinafter, also referred to as "zero learning") be executed and then the detected value of the resolver be corrected on the basis of the result. However, if zero learning has not been completed, there is a concern that an error arises in estimated torque due to the influence of the zero offset error and, as a result, the output torque of the motor rapidly varies.

SUMMARY OF THE INVENTION

The invention provides a vehicle that executes rectangular-wave control over a motor using an output of a resolver and that includes a control device configured to execute control for avoiding a rapid variation in output torque of the motor even during not-yet zero learning, and a control method for the vehicle.

An aspect of the invention provides a vehicle including: a motor having a rotor; a resolver configured to detect a rotation angle of the rotor; and a control device. The control device is configured to execute rectangular-wave control over the motor using the rotation angle of the rotor, the rotation angle being detected by the resolver. The control device is configured to execute zero learning for learning a deviation between an origin of an actual rotation angle of the rotor and an origin of the detected rotation angle of the rotor, and correct the detected rotation angle of the rotor on the basis of a result of the zero learning. The control device is configured to execute avoidance control for avoiding a rapid variation in output of the motor when the zero learning has not been completed yet.

Another aspect of the invention provides a control method for a vehicle including: a motor having a rotor and a resolver configured to detect a rotation angle of the rotor. The control method includes: detecting the rotation angle of the rotor with the use of the resolver; executing rectangular-wave control over the motor using the detected rotation angle; executing zero learning for learning a deviation between an origin of an actual rotation angle of the rotor and an origin of the detected rotation angle of the rotor; correcting the detected rotation angle of the rotor on the basis of a result of the zero learning; and executing avoidance control for avoiding a rapid variation in output of the motor when the zero learning has not been completed yet.

In the vehicle and the control method therefor, a control range of a rectangular-wave voltage phase that is used in the rectangular-wave control may be set to a first range after the zero learning has been completed. The avoidance control may be control for limiting the control range of the rectangular-wave voltage phase as compared to the first range.

In the vehicle and the control method therefor, when the rectangular-wave control is executed, an estimated torque of the motor may be calculated using the detected rotation angle of the rotor and then feedback control may be executed over the motor on the basis of a deviation between the estimated torque and a command torque of the motor. An upper limit of the command torque during the rectangular-wave control may be set to a first line after the zero learning has been completed. The avoidance control may be control for decreasing the upper limit of the command torque during the rectangular-wave control to below the first line.

In the vehicle and the control method therefor, the avoidance control may be control for prohibiting execution of the rectangular-wave control over the motor.

In the vehicle and the control method therefor, the avoidance control may be control for correcting the detected rotation angle of the rotor, which is used to calculate the estimated torque, such that the estimated torque is increased.

In the vehicle and the control method therefor, an estimated torque of the motor may be calculated using the detected rotation angle of the rotor and then feedback control may be executed over the motor on the basis of a deviation between the estimated torque and a command torque of the motor when the rectangular-wave control is executed. The avoidance control may be control for correcting the estimated torque to increase the estimated torque, the estimated torque being calculated using the detected rotation angle of the rotor.

In the vehicle and the control method therefor, the avoidance control may be control for indirectly correcting the estimated torque to increase the estimated torque by correcting the detected rotation angle or the avoidance control may be control for directly correcting the estimated torque to increase the estimated torque by increasing the estimated torque by a predetermined value.

In the vehicle and the control method therefor, an estimated torque of the motor may be calculated using the detected rotation angle of the rotor and then feedback control may be executed over the motor on the basis of a deviation between the estimated torque and a command torque of the motor when the rectangular-wave control is executed. The avoidance control may be control for limiting a rate of change in the command torque to below a predetermined value.

With the vehicle and the control method therefor according to the invention, in the vehicle that executes rectangular-wave control over the motor using an output of the resolver, it is possible to avoid a rapid variation in output torque of the motor even during not-yet zero learning.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a view for illustrating control modes of a motor mounted on the vehicle;

FIG. 3 is a graph that shows the correlation between a PWM control region and a rectangular-wave voltage control region for the control modes of the motor;

DETAILED DESCRIPTION OF EMBODIMENTS

Figure 1:
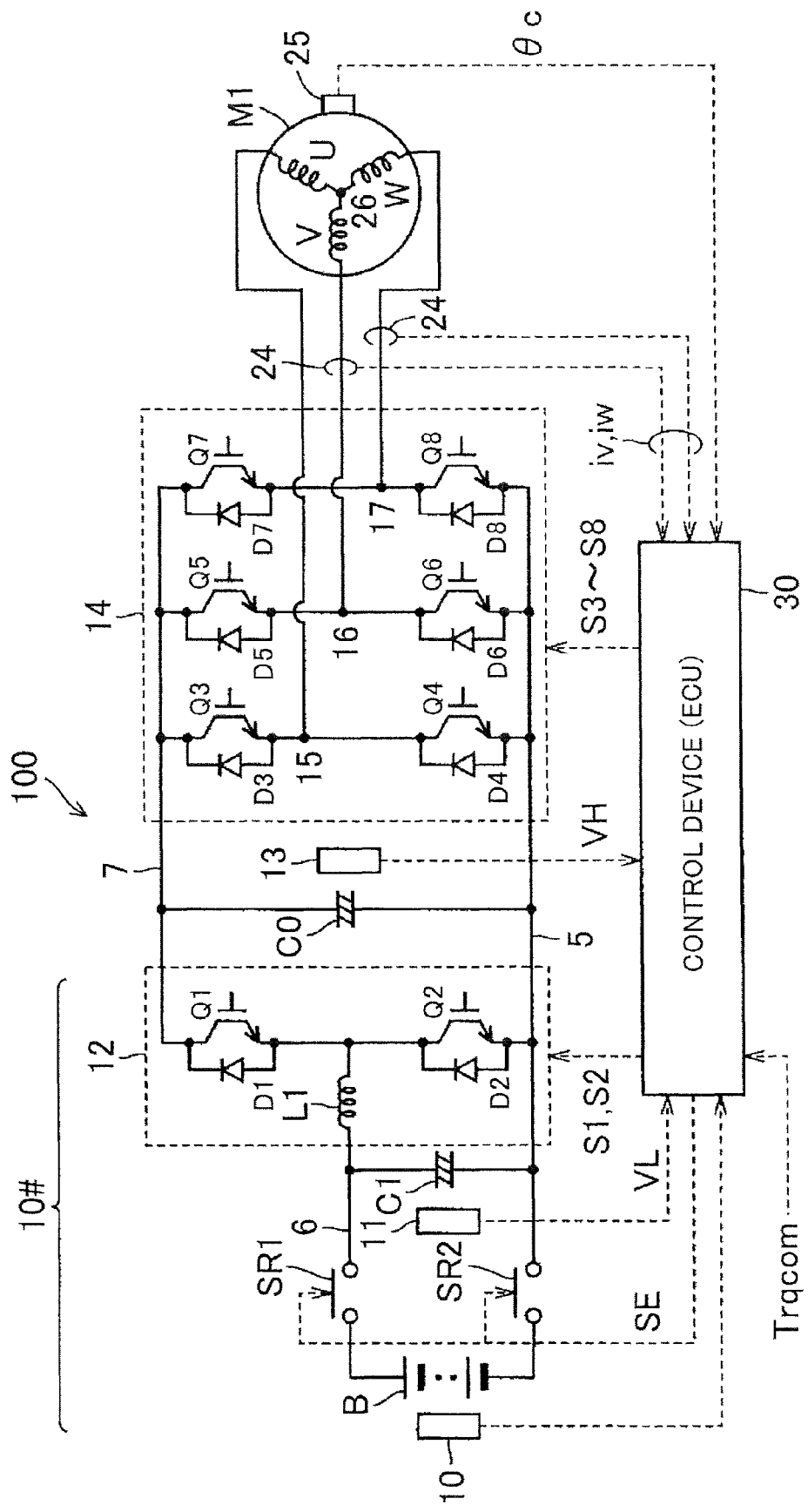
FIG. 1 is a schematic configuration view of a vehicle according to an embodiment.

Hereinafter, embodiments of the invention will be described in detail with reference to the accompanying drawings. Like reference numerals denote the same or corresponding portions in the drawings, and the description thereof will not be repeated basically.

FIG. 1 is a schematic configuration view of a vehicle 100 according to a first embodiment of the invention. The vehicle 100 includes a direct-current voltage generating unit 10#, a smoothing capacitor C0, an inverter 14, a control device (ECU) 30 and a motor M1.

The motor M1 is an alternating-current synchronous motor including a rotor, and is, for example, a permanent magnet-type synchronous motor that uses a permanent magnet for the rotor. The motor M1 has a salient inductance (characteristic that a d-axis inductance and a q-axis inductance differ from each other).

In the present embodiment, the motor M1 is a drive motor that generates torque for driving drive wheels of an electromotive vehicle, such as a hybrid vehicle and an electric vehicle. The electromotive vehicle includes overall vehicles on which a motor for generating vehicle driving force is mounted, and includes an electric vehicle on which no engine is mounted. The motor M1 is generally configured to also function as a generator.

The direct-current voltage generating unit 10# includes a direct-current power supply B, system relays SR1, SR2, a smoothing capacitor C1 and a converter 12.

The direct-current power supply B is formed of a secondary battery configured to include nickel metal hydrides, lithium ions, or the like, a fuel cell, an electric double layer capacitor or a combination of any two or more of them. The voltage (Vb), current and temperature of the direct-current power supply B are detected by a monitoring unit 10 provided at the direct-current power supply B. Detected values of the monitoring unit 10 are output to the control device 30.

The system relay SR1 is connected between the positive electrode terminal of the direct-current power supply B and a power line 6, and the system relay SR2 is connected between the negative electrode terminal of the direct-current power supply B and a power line 5. The system relays SR1, SR2 are turned on or off by a signal SE from the control device 30. The smoothing capacitor C1 is connected between the power line 6 and the power line 5. A direct-current voltage VL between the power line 6 and the power line 5 is detected by a voltage sensor 11. A detected value of the voltage sensor 11 is transmitted to the control device 30.

The converter 12 includes a reactor L1, power semiconductor switching elements Q1, Q2, and diodes D1, D2 (also referred to as antiparallel diodes).

The power semiconductor switching elements Q1, Q2 are serially connected between the power line 7 and the power line 5. On/off states of the power semiconductor switching elements Q1, Q2 are controlled by switching control signals S1, S2 from the control device 30.

In the embodiment of the invention, each of the power semiconductor switching elements (hereinafter, simply referred to as "switching elements") may be an insulated gate bipolar transistor (IGBT), a power metal oxide semiconductor (MOS) transistor, a power bipolar transistor, or the like. The antiparallel diodes D1, D2 are respectively connected to the switching elements Q1, Q2.

The reactor L1 is connected between a connection node of the switching elements Q1, Q2 and the power line 6. In addition, the smoothing capacitor C0 is connected between the power line 7 and the power line 5.

The inverter 14 is formed of a U-phase arm 15, a V-phase arm 16 and a W-phase arm 17 that are provided in parallel between the power line 7 and the power line 5. The arm of each phase is formed of switching elements serially connected between the power line 7 and the power line 5. For example, the U-phase aim 15 includes switching elements Q3, Q4. The V-phase arm 16 includes switching elements Q5, Q6. The W-phase arm 17 includes switching elements Q7, Q8. Antiparallel diodes D3 to D8 are respectively connected to the switching elements Q3 to Q8. On/off states of the switching elements Q3 to Q8 are controlled by switching control signals S3 to S8 from the control device 30.

A midpoint of the arm of each phase is connected to the end of a corresponding one of the three-phase coils of the motor M1. One ends of the three U, V, W-phase coils are commonly connected to a neutral point 26.

The converter 12 carries out switching operations in response to the switching control signals S1, S2 from the control device 30. At the time of step-up operation, the converter 12 steps up the direct-current voltage VL, which is supplied from the direct-current power supply B, to a direct-current voltage VH (which corresponds to an input voltage to the inverter 14, and, hereinafter, this direct-current voltage is also termed "system voltage"). At the time of step-down operation, the converter 12 steps down the direct-current voltage VH to the direct-current voltage VL. A voltage conversion ratio (the ratio of VH and VL) in the step-up operation or the step-down operation is controllable by adjusting control duty ratios of the switching elements Q1, Q2. When the converter 12 is stopped, VH=VL (voltage conversion ratio=1.0) is obtained.

The smoothing capacitor C0 smoothes the direct-current voltage applied to the power line 7. The voltage sensor 13 detects the voltage between both ends of the smoothing capacitor C0, that is, the system voltage VH, and outputs the detected value to the control device 30.

The inverter 14 carries out switching operations in response to the switching control signals S3 to S8 from the control device 30. When a torque command value of the motor M1 is positive (Trqcom>0), the inverter 14 converts the direct-current voltage applied to the power line 7 to alternating-current voltages, and drives the motor M1 such that the motor M1 outputs a positive torque. When the torque command value of the motor M1 is zero (Trqcom=0), the inverter 14 converts the direct-current voltage to alternating-current voltages, and drives the motor M1 such that the torque becomes zero. Thus, the motor M1 is driven so as to generate zero or positive torque specified by the command torque Trqcom.

At the time of regenerative braking of the vehicle 100, the command torque Trqcom of the motor M1 is set to a negative value (Trqcom<0). In this case, the inverter 14 converts alternating-current voltages generated by the motor M1 to direct-current voltage, and supplies the converted direct-current voltage (system voltage) to the converter 12 via the smoothing capacitor C0.

A current sensor 24 detects currents (phase currents) flowing through the motor M1, and outputs the detected values to the control device 30. The sum of instantaneous values of three-phase currents iu, iv, iw is zero, so the current sensor 24 may be configured to detect two-phase motor currents (for example, the V-phase current iv and the W-phase current iw) as shown in FIG. 1.

A resolver 25 detects a rotor rotation angle (magnetic pole positions of the rotor) of the motor M1, and transmits the detected rotor rotation angle to the control device 30. In the following description, the rotor rotation angle detected by the resolver 25 is referred to as "detected rotor angle θc". As will be described later, the control device 30 controls the output of the motor M1 using the detected rotor angle θc.

The control device 30 is formed of an electronic control unit (ECU), and controls devices of the vehicle 100 through software processing in which a prestored program is executed in a central processing unit (CPU) (not shown) and/or hardware processing of an exclusive electronic circuit.

For example, the control device 30 generates the switching control signals S1, S2 for bringing the system voltage VH into coincidence with a voltage command value, and outputs the switching control signals S1, S2 to the converter 12. In addition, the control device 30 generates the switching control signals S3 to S8 such that the motor M1 outputs a torque according to the command torque Trqcom through a control mode (described later), and outputs the switching control signals S3 to S8 to the inverter 14.

FIG. 2 is a view for illustrating control modes of the motor M1. The control device 30 controls the motor M1 in a pulse width modulation (PWM) control mode or a rectangular-wave voltage control mode.

The PWM control mode includes two control modes, that is, a sinusoidal PWM control mode and an overmodulation PWM control mode. Sinusoidal PWM control is used as a general PWM control mode, and on/off states of each pair of switching elements of a corresponding one of the three-phase arms are controlled in accordance with a voltage comparison between a sinusoidal voltage command value and a carrier wave (typically, triangular wave). Overmodulation PWM control is to distort the amplitude of the carrier wave such that the amplitude is reduced and then to execute PWM control similar to the above-described sinusoidal PWM control. In these PWM control modes, it is just possible to increase a modulation factor to the range around 0.78.

On the other hand, rectangular-wave voltage control is to apply one rectangular-wave pulse, of which the ratio of the high-level period and the low-level period is 1 to 1, to the motor M1, and corresponds to the case where a PWM duty ratio is kept at the maximum value. Thus, the modulation factor is increased to about 0.78.

The above-described PWM control and rectangular-wave voltage control are known control modes, so the detailed description will not be repeated here.

FIG. 3 is a graph that shows the correlation between a PWM control region and a rectangular-wave voltage control region. A motor operation point that is determined on the basis of the rotation speed and torque of the motor M1 is controlled in a region lower than an upper limit line shown in FIG. 3. Within the region lower than the upper limit line, a low torque and low rotation speed-side region A1 with respect to a boundary line shown in FIG. 3 is a PWM control region, and a high torque and high rotation speed-side region A2 with respect to the boundary line is a rectangular-wave voltage control region. The control device 30 controls the motor M1 in the PWM control mode when the motor operation point falls within the region A1, and controls the motor M1 in the rectangular-wave voltage control mode when the motor operation point falls within the region A2.

In any control mode, a rotating coordinate system having a magnetic flux direction (d axis) of the permanent magnet of the rotor and a direction (q axis) perpendicular to the magnetic flux direction is used in control over the motor M1. The rotating coordinate system is recognized on the basis of the detected rotor angle θc. In the following description, as distinguished from actual d axis, q axis and d-q axes, d axis, q axis and d-q axes recognized on the basis of the detected rotor angle θc in control are respectively referred to as "dc axis", "qc axis" and "dc-qc axes".

Figure 4:
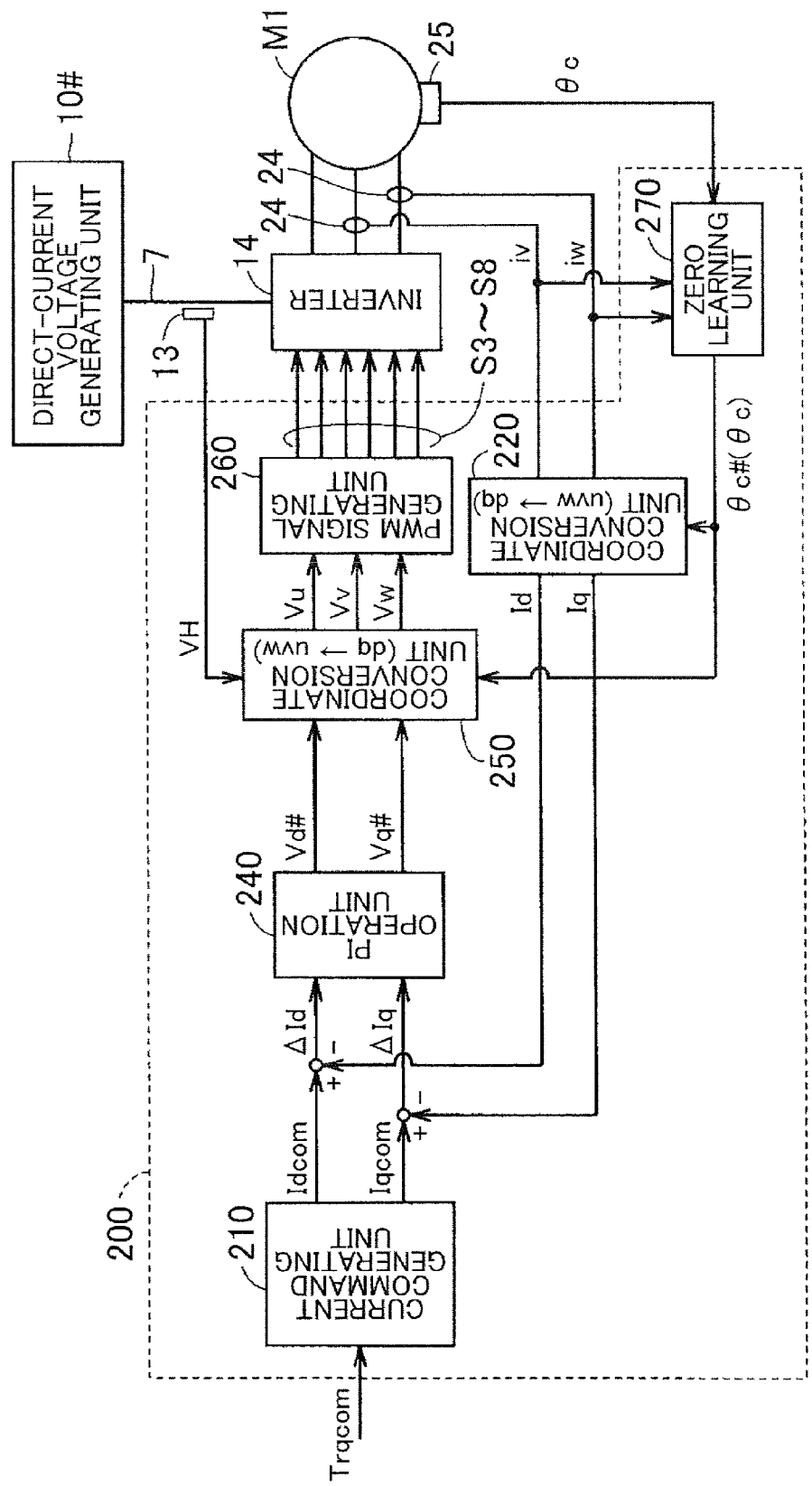
FIG. 4 is a control block diagram of the PWM control.

Next, PWM control will be described. FIG. 4 is a control block diagram of PWM control that is executed by the control device 30. The control device 30 includes a PWM control unit 200 that executes PWM control. The PWM control unit 200 includes a current command generating unit 210, coordinate conversion units 220, 250, a PI operation unit 240, a PWM signal generating unit 260 and a zero learning unit 270.

The current command generating unit 210 generates a d-axis current command value Idcom and a q-axis current command value Iqcom based on the command torque Trqcom in accordance with a prepared table, or the like.

The zero learning unit 270 recognizes the dc-qc axes (d-q axes in control) on the basis of the detected rotor angle θc, and calculates a difference between the recognized dc-qc axes and actual d-q axes (hereinafter, referred to as "zero offset error Δθ").

The zero offset error Δθ is an error that arises due to a deviation of a mounting position of the resolver 25 with respect to a coil position of the motor M1, and corresponds to a difference between the origin of the detected rotor angle θc and the origin of the actual rotor rotation angle θ. The zero offset error Δθ is constant irrespective of the detected rotor angle θc, and is an error different from an error (so-called periodical error) that periodically fluctuates on the basis of the detected rotor angle θc. Hereinafter, control for calculating the zero offset error Δθ is also simply referred as "zero learning". A technique for zero learning will be described in detail later.

When the zero learning unit 270 has completed zero learning, the zero learning unit 270 corrects the detected rotor angle θc using the zero offset error Δθ obtained through zero learning, and outputs the corrected detected rotor angle θc as a "learned rotor angle θc#". When the zero learning unit 270 has not completed zero learning, the zero learning unit 270 directly outputs the detected rotor angle θc output from the resolver 25.

The coordinate conversion unit 220 calculates a d-axis current Id and a q-axis current Iq on the basis of the V-phase current iv and the W-phase current iw detected by the current sensor 24 through coordinate conversion (three phases to two phases) using the output (the learned rotor angle θc# or the detected rotor angle θc) of the zero learning unit 270.

A deviation ΔId of the d-axis current from the command value (ΔId=Idcom−Id) and a deviation ΔIq of the q-axis current from the command value (ΔIq Iqcom−Iq) are input to the PI operation unit 240. The PI operation unit 240 obtains a control deviation by performing PI operation on the d-axis current deviation ΔId and the q-axis current deviation ΔIq using a predetermined gain, and generates a d-axis voltage command value Vd# and a q-axis voltage command value Vq# based on the control deviation.

The coordinate conversion unit 250 converts the d-axis voltage command value Vd# and the q-axis voltage command value Vq# to U-phase, V-phase and W-phase voltage command values Vu, Vv, Vw through coordinate conversion (two phases to three phases) using the output (the learned rotor angle θc# or the detected rotor angle θc) of the zero learning unit 270. The system voltage VH is also reflected in conversion from the d-axis and q-axis voltage command values Vd#, Vq# to the three-phase voltage command values Vu, Vv, Vw.

The PWM signal generating unit 260 generates the switching control signals S3 to S8 shown in FIG. 1 on the basis of a comparison between the three-phase voltage command values Vu, Vv, Vw and a predetermined carrier wave (carrier signal). The inverter 14 is subjected to switching control in accordance with the switching control signals S3 to S8. Thus, alternating-current voltages for outputting a torque according to the command torque Trqcom input to the current command generating unit 210 are applied to the motor M1.

In this way, in PWM control, current feedback control is executed such that the motor currents (Id, Iq) follow the current command values (Idcom, Iqcom) based on the command torque Trqcom.

Figure 5:
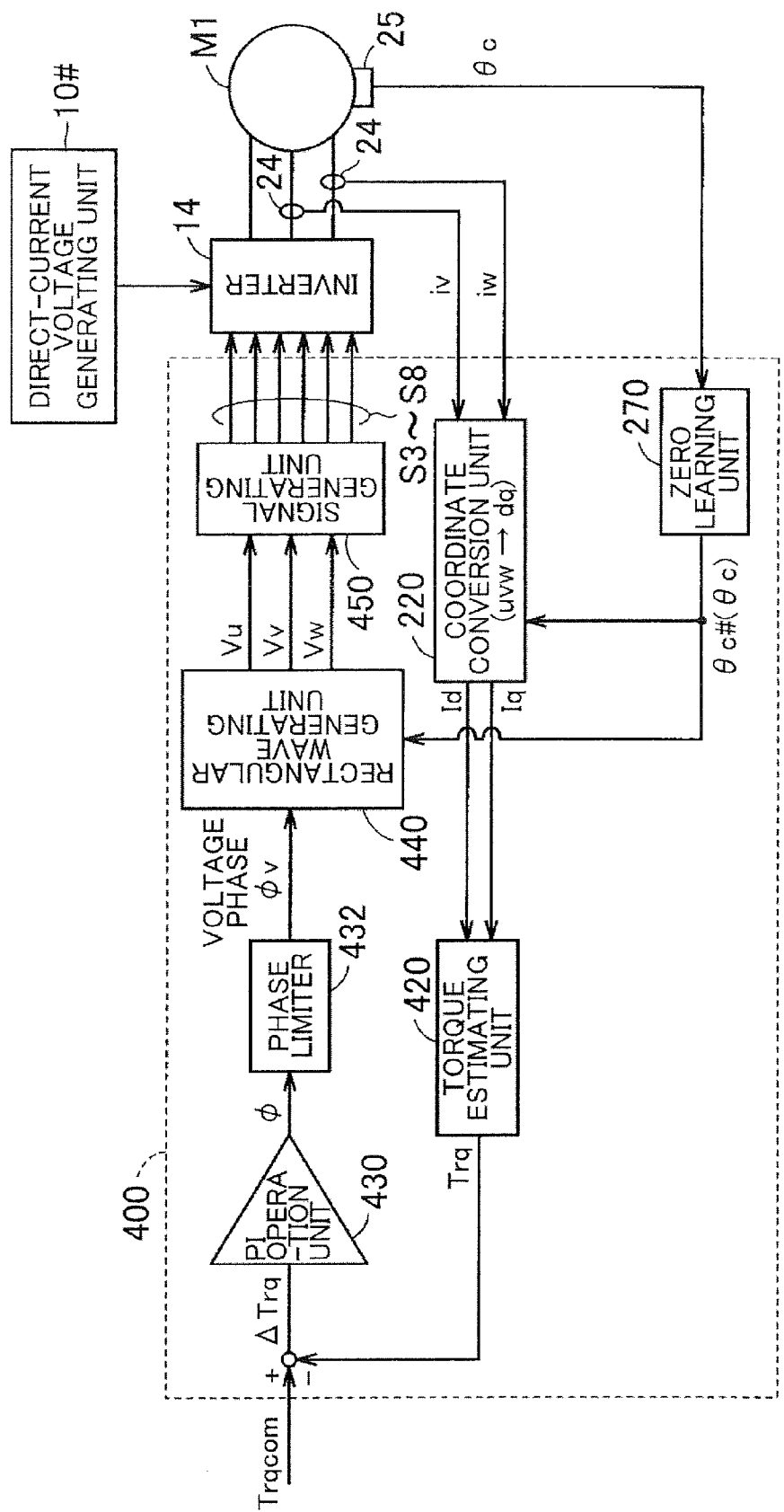
FIG. 5 is a control block diagram of the rectangular-wave voltage control.

Next, rectangular-wave voltage control will be described. FIG. 5 is a control block diagram of rectangular-wave voltage control that is executed by the control device 30. The control device 30 includes a rectangular-wave voltage control unit 400 that executes rectangular-wave voltage control. The rectangular-wave voltage control unit 400 includes the coordinate conversion unit 220, the zero learning unit 270, a torque estimating unit 420, a PI operation unit 430, a phase limiter 432, a rectangular wave generating unit 440 and a signal generating unit 450.

As in the case of the PWM control mode, the zero learning unit 270 outputs the learned rotor angle θc# when the zero learning unit 270 has completed zero learning, and directly outputs the detected rotor angle θc when the zero learning unit 270 has not completed zero learning.

As in the case of the PWM control mode, the coordinate conversion unit 220 converts the three-phase currents, obtained from the V-phase current iv and the W-phase current iw, to the d-axis current Id and the q-axis current Iq using the output (the learned rotor angle θc# or the detected rotor angle θc) of the zero learning unit 270.

The torque estimating unit 420 estimates the output torque of the motor M1 using the d-axis current Id and q-axis current Iq obtained with the use of the coordinate conversion unit 220. The torque estimating unit 420 is, for example, formed of a torque calculation map that outputs an estimated torque Trq using the d-axis current Id and the q-axis current Iq as arguments.

A deviation ΔTrq of the estimated torque Trq with respect to the command torque Trqcom (ΔTrq=Trqcom−Trq) is input to the PI operation unit 430. The PI operation unit 430 obtains a control deviation by performing PI operation over the torque deviation ΔTrq using a predetermined gain, and sets a phase φ of rectangular-wave voltage on the basis of the obtained control deviation. The PI operation unit 430 advances the phase φ when the deviation ΔTrq is positive; otherwise, the PI operation unit 430 retards the phase φ. In this way, in rectangular-wave voltage control, the estimated torque Trq is caused to follow the command torque Trqcom by adjusting the phase φ of rectangular-wave voltage.

The phase limiter 432 outputs a voltage phase φv to the rectangular wave generating unit 440. The voltage phase φv is obtained by setting a predetermined limit to the phase φ that is output from the PI operation unit 430. In the present embodiment, the phase limiter 432 executes control for avoiding a rapid variation in the output of the motor M1 (hereinafter, also referred to as "rapid torque variation avoidance control") during not-yet zero learning. Specifically, the phase limiter 432 limits the control range of the phase φ during not-yet zero learning as compared to the control range of the phase φ after zero learning (during normal times). This is the most characterizing point in the present embodiment. Rapid torque variation avoidance control (a technique for limiting the phase φ) that is executed by the phase limiter 432 will be described in detail later.

The rectangular wave generating unit 440 generates the three-phase voltage command values (rectangular-wave pulses) Vu, Vv, Vw in accordance with the voltage phase φv output from the phase limiter 432. The signal generating unit 450 generates the switching control signals S3 to S8 in accordance with the three-phase voltage command values Vu, Vv, Vw. The inverter 14 performs switching operations in accordance with the switching control signals S3 to S8. Thus, rectangular-wave pulsed voltages according to the voltage phase φv are respectively applied to the three phases of the motor M1.

In this way, in rectangular-wave voltage control, torque feedback control is executed such that the estimated torque Trq of the motor M1 is caused to follow the command torque Trqcom.

Figure 6:
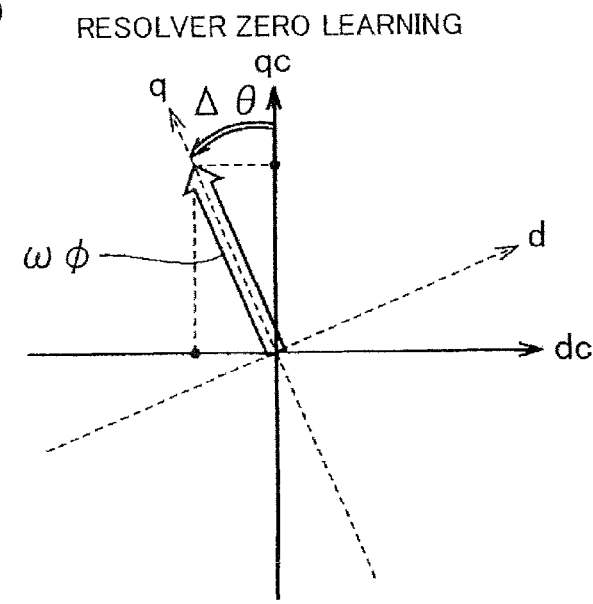
FIG. 6 is a graph for illustrating a technique for zero learning that is executed by a zero learning unit in the rectangular-wave voltage control shown in FIG. 5.

Next, zero learning will be described. FIG. 6 is a view for illustrating a technique for zero learning that is executed by the above-described zero learning unit 270. The technique for zero learning is not necessarily limited to a technique described below.

Generally, the voltage equation of the motor is simply expressed by the following mathematical expression (1).

$$Vd = -\omega L dId, Vq = \omega L qIq + \omega \Phi \quad (1)$$

In the mathematical expression (1), "ω" denotes an electric angular velocity, "Ld" denotes a d-axis inductance, "Lq" denotes a q-axis inductance, and "Φ" denotes the number of armature flux linkages.

In a state where no current is flowing through the motor M1 (Id=Iq=0) and the motor M1 is rotating (ω is not 0), Vd=0 and Vq=ωΦ are obtained from the mathematical expression (1), and a counter electromotive voltage of ωΦ is applied to only the q axis. However, as shown in FIG. 6, if there is a zero offset error Δθ between the dc-qc axes in control and the actual d-q axes, it is recognized that the counter electromotive voltage ωΦ is applied to not only the qc axis but also the dc axis in control, so it is not recognized that the motor current is 0.

The zero learning unit 270 executes zero learning by utilizing such a phenomenon. Specifically, the zero learning unit 270 determines whether a learning permission condition is satisfied. The learning permission condition is satisfied in a state where no current is flowing through the motor M1 and the motor M1 is rotating. When the learning permission condition is satisfied, the zero learning unit 270 rotates the dc-qc axes in predetermined angles, and determines whether the motor current is recognized as 0. The zero learning unit 270 learns the rotation angle of the dc-qc axes, at which the motor current is recognized as 0, as the zero offset error Δθ.

Next, rapid torque variation avoidance control will be described. As described above, the zero learning unit 270 executes zero learning when the learning permission condition is satisfied. After completion of zero learning, the zero learning unit 270 outputs the "learned rotor angle θc#" obtained by correcting the detected rotor angle θc using the zero offset error Δθ.

However, during not-yet zero learning, the zero learning unit 270 directly outputs the detected rotor angle θc, detected by the resolver 25, to the coordinate conversion unit 220. Therefore, during not-yet zero learning, there arises an error based on the zero offset error Δθ in the d-axis current Id and the q-axis current Iq that are calculated by the coordinate conversion unit 220. As a result, particularly, in torque feedback control within rectangular-wave voltage control, there arises an error in the estimated torque Trq estimated by the torque estimating unit 420, and there is a concern that the output torque of the motor M1 rapidly varies.

As control for avoiding such a rapid torque variation (rapid torque variation avoidance control), the phase limiter 432 according to the present embodiment limits the control range of the rectangular-wave voltage phase ϕ during not-yet zero learning as compared to the control range of the rectangular-wave voltage phase ϕ after completion of zero learning (during normal times) as described above.

Figure 7:
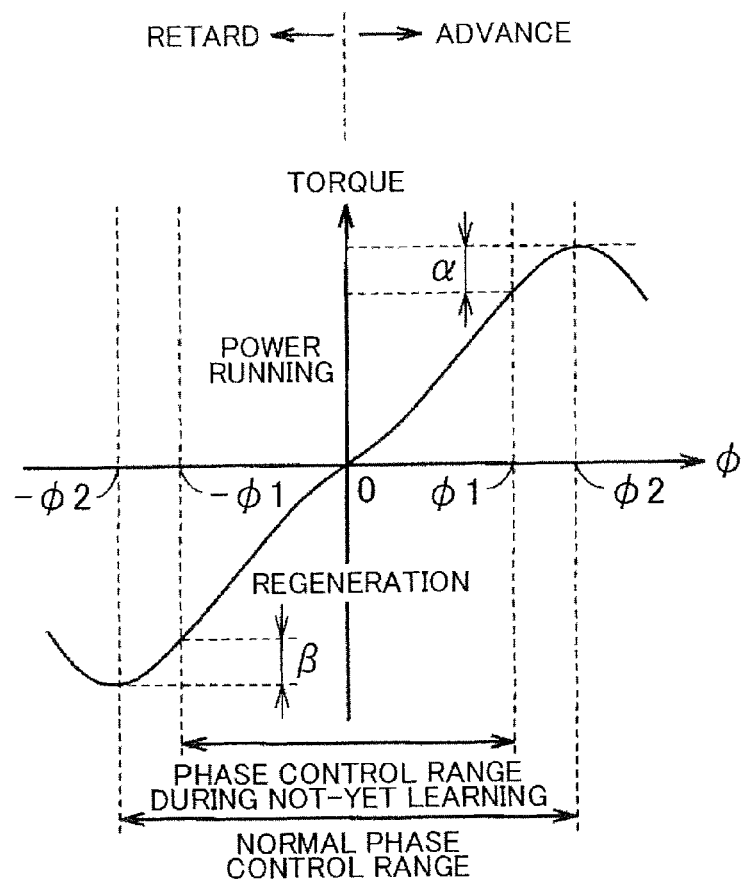
FIG. 7 is a view for illustrating rapid torque variation avoidance control that is executed by a phase limiter in the rectangular-wave voltage control shown in FIG. 5.

FIG. 7 is a graph for illustrating rapid torque variation avoidance control (technique for limiting the phase ϕ) that is executed by the phase limiter 432. As shown in FIG. 7, the output torque of the motor M1 varies on the basis of the phase ϕ of rectangular-wave voltage. Specifically, when the phase ϕ is 0, the output torque is 0. In the region in which the voltage phase ϕ is larger than 0 (advanced region), the output torque is a positive value, and the output torque is maximum at ϕ=ϕ2. In the region in which the voltage phase ϕ is smaller than 0 (retarded region), the output torque is a negative value, and the output torque is minimum at ϕ=−ϕ2.

The phase limiter 432 determines whether zero learning has been completed. When zero learning has been completed (during normal times), the phase limiter 432 limits the phase ϕ to the range of −ϕ2 to ϕ2. On the other hand, when zero learning has not been completed yet, the phase limiter 432 limits the phase ϕ to the range of −ϕ1 (>−ϕ2) to ϕ1 (<ϕ2). In this way, the phase limiter 432 limits the control range (−ϕ1 to ϕ1) of the phase ϕ during not-yet zero learning as compared to the control range (−ϕ2 to ϕ2) of the phase ϕ during normal times. Thus, during not-yet zero learning, in rectangular-wave voltage control, control is avoided in a high torque region (which means a region in which the absolute value of torque is large, and regions α, β in the example of FIG. 7) in which the influence of the zero offset error Δθ is particularly large. Therefore, even during not-yet zero learning, it is possible to avoid a rapid variation in output torque.

As described above, in the present embodiment, the control range of the phase ϕ of rectangular-wave voltage during not-yet zero learning is limited as compared to that during normal times (after completion of zero learning). Thus, control is avoided in a high torque region in which the influence of the zero offset error Δθ is particularly large. Therefore, it is possible to avoid a rapid variation in output torque even during not-yet zero learning.

Next, a first alternative embodiment to the first embodiment will be described. In rapid torque variation avoidance control according to the above-described first embodiment, the control range of the phase ϕ of rectangular-wave voltage during not-yet zero learning is limited as compared to that during normal times in order to avoid control in a high torque region in which the influence of the zero offset error Δθ is particularly large.

In contrast to this, in rapid torque variation avoidance control according to the first alternative embodiment, torque during not-yet zero learning is limited as compared to that during normal times in rectangular-wave voltage control in order to further directly avoid control in a high torque region.

Figure 8:
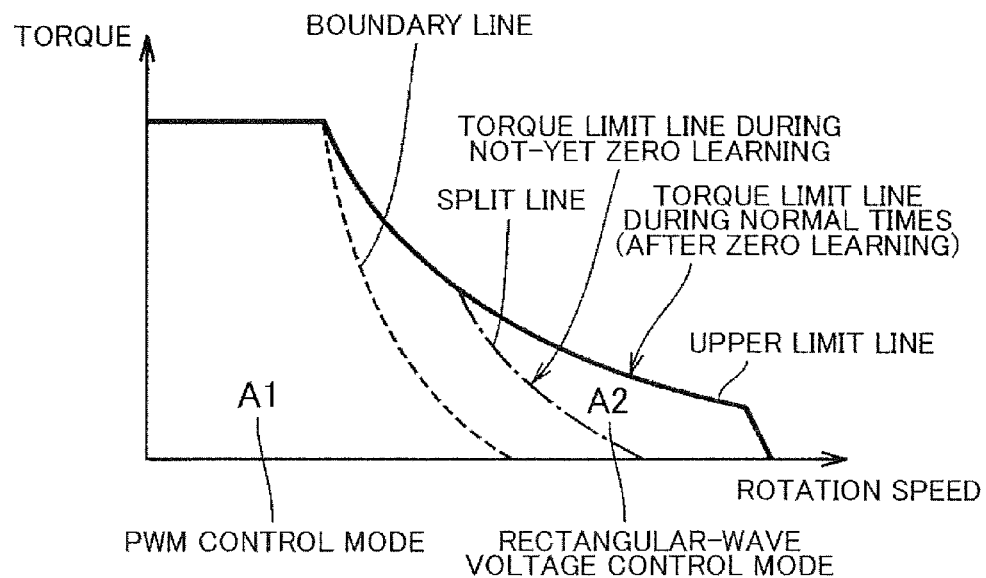
FIG. 8 is a graph for illustrating a first alternative embodiment of the rapid torque variation avoidance control.

FIG. 8 is a graph for illustrating an example of rapid torque variation avoidance control (torque limiting) according to the first alternative embodiment. In the first alternative embodiment, a split line (see the alternate long and short dashes line) that splits the rectangular-wave voltage control region A2 into a high torque and high rotation speed-side region and a low torque and low rotation speed-side region is provided. During rectangular-wave voltage control, the control device 30 sets the setting range of the command torque Trqcom to all the rectangular-wave voltage control region A2 during normal times (after completion of zero learning), and limits the setting range of the command torque Trqcom to the low torque and low rotation speed-side region with respect to the split line during not-yet zero learning. That is, during rectangular-wave voltage control, the upper limit of the command torque Trqcom is set to the upper limit line during normal times (after completion of zero learning), and the upper limit of the command torque Trqcom is set to the split line on a lower torque side than the upper limit line during not-yet zero learning.

Thus, setting of the command torque Trqcom to a high torque region that exceeds the split line is avoided during not-yet zero learning. Therefore, as in the case of the first embodiment, it is possible to avoid a rapid variation in output torque even during not-yet zero learning.

Next, a second alternative embodiment to the first embodiment will be described. As another technique for directly avoiding control in a high torque region, execution of rectangular-wave voltage control may be prohibited and the control mode of the motor M1 may be fixed to the PWM control mode during not-yet zero learning.

Figure 9:
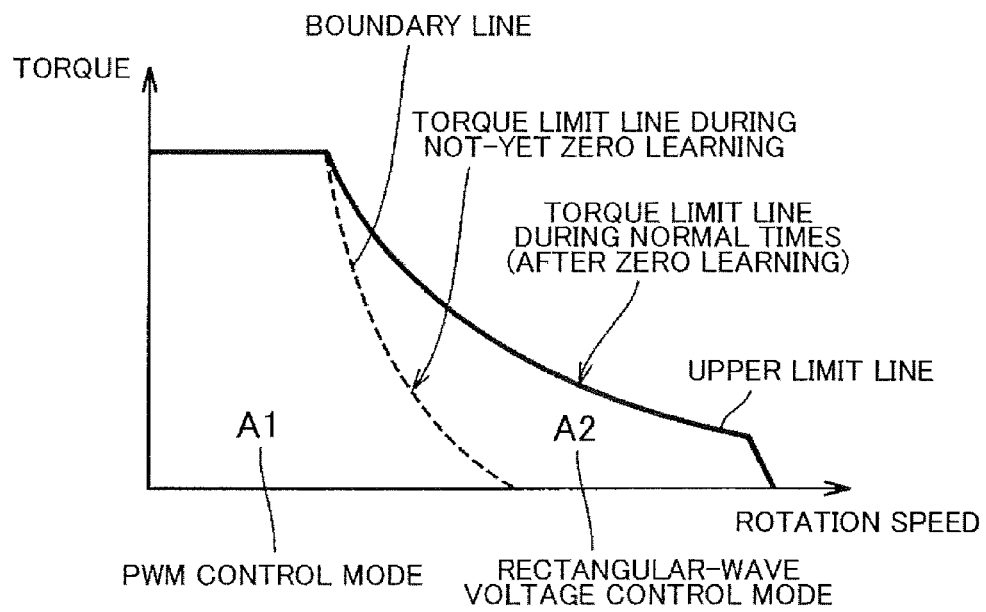
FIG. 9 is a graph for illustrating a second alternative embodiment of the rapid torque variation avoidance control.

FIG. 9 is a graph for illustrating rapid torque variation avoidance control (prohibition of rectangular-wave voltage control) according to the second alternative embodiment. In the second alternative embodiment, the control device 30 allows setting of the command torque Trqcom in the rectangular-wave voltage control region A2 during normal times (after completion of zero learning), and prohibits setting of the command torque Trqcom in the rectangular-wave voltage control region A2 during not-yet zero learning. In other words, the upper limit of the command torque Trqcom is set to the upper limit line during normal times (after completion of zero learning), and the upper limit of the command torque Trqcom is set to the boundary line on a lower torque side than the upper limit line during not-yet zero learning.

Thus, during not-yet zero learning, rectangular-wave voltage control is prohibited, and the control mode of the motor M1 is fixed to the PWM control mode. Therefore, during not-yet zero learning, setting of the command torque Trqcom to the region A2 that is a relatively high torque region is avoided. Therefore, as in the case of the first embodiment, it is possible to avoid a rapid variation in output torque even during not-yet zero learning.

Next, a second embodiment will be described. In rapid torque variation avoidance control according to the above-described first embodiment, control is avoided in a high torque region (regions α, β in FIG. 7) in which the influence of the zero offset error Δθ is large during not-yet zero learning. Therefore, during not-yet zero learning, it is possible to avoid a rapid variation in output torque, while, on the other hand, it is not possible to output high torque.

In rapid torque variation avoidance control according to the second embodiment, when rectangular-wave voltage control is executed, the detected rotor position θc that is used to calculate the estimated torque Trq is corrected by a predetermined technique such that a rapid variation in output torque is avoided while control is allowed in a high torque region during not-yet zero learning. The other structures, functions and processes are the same as those of the above-described first embodiment, so the detailed description will not be repeated.

Figure 10:
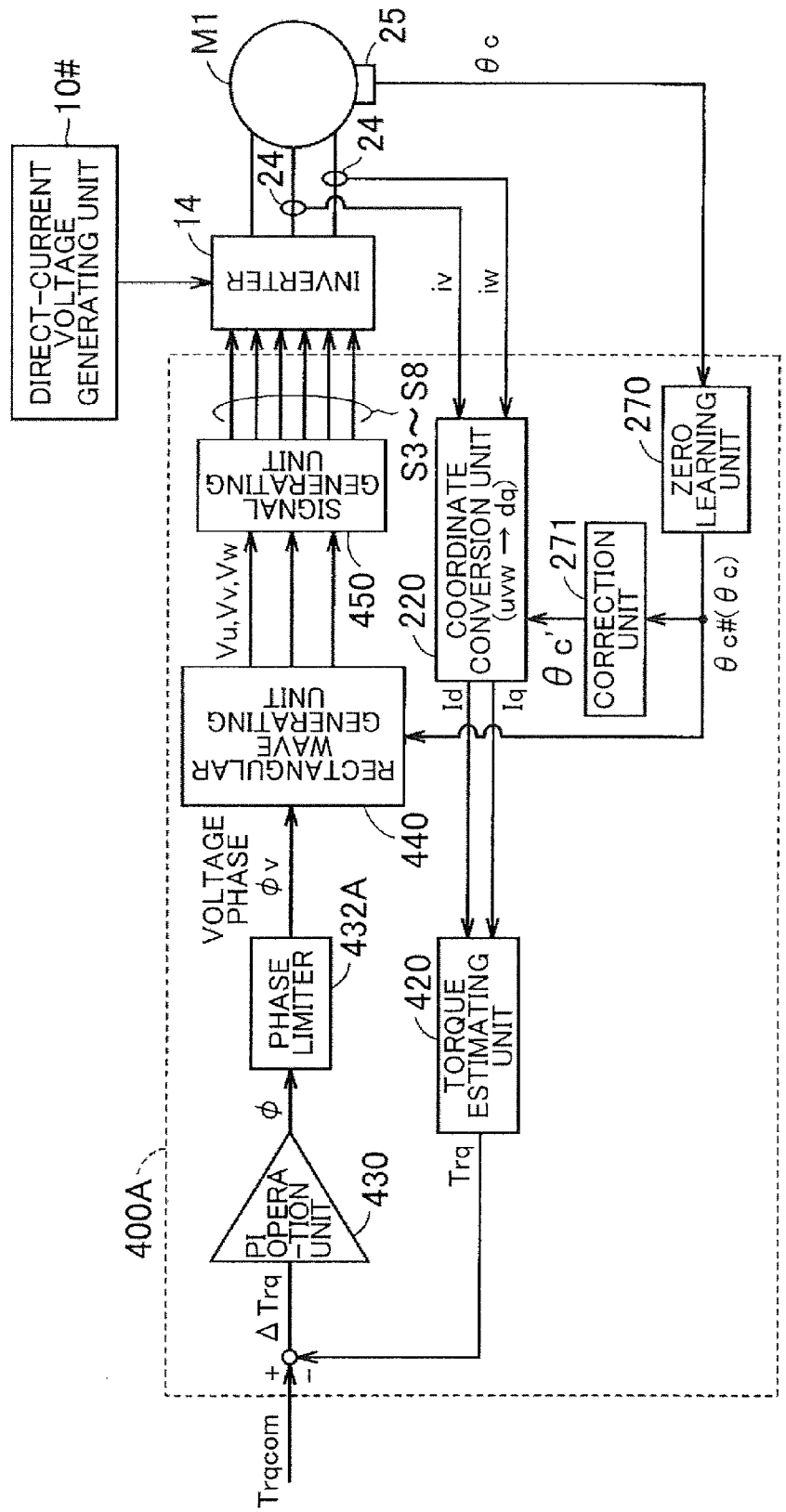
FIG. 10 is a control block diagram of rectangular-wave voltage control according to a second embodiment of the invention.

Hereinafter, rapid torque variation avoidance control (correcting the detected rotor position θc) according to the second embodiment will be described. FIG. 10 is a control block diagram of rectangular-wave voltage control that is executed by a rectangular-wave voltage control unit 400A according to the second embodiment. The rectangular-wave voltage control unit 400A differs from the above-described rectangular-wave voltage control unit 400 shown in FIG. 5 in that the phase limiter 432 is changed to a phase limiter 432A and a correction unit 271 is further added. The other functional blocks have been already described, so the detailed description will not be repeated.

The phase limiter 432A outputs a voltage phase φv to the rectangular wave generating unit 440. The voltage phase φv is obtained by setting a predetermined limit to the phase φ that is output from the PI operation unit 430. At this time, even during not-yet zero learning, the phase limiter 432A sets the control range of the phase φ to the above-described range of −φ2 to φ2 shown in FIG. 7 as well as during normal times (after zero learning). Thus, even during not-yet zero learning, control is allowed in a high torque region (regions α, β in FIG. 7).

During not-yet zero learning, the correction unit 271 corrects the detected rotor angle θc output from the zero learning unit 270 with the use of a predetermined technique, and outputs the corrected detected rotor angle θc to the coordinate conversion unit 220 as "corrected rotor angle θc'". After zero learning, the correction unit 271 directly outputs the learned rotor angle θc# output from the zero learning unit 270 to the coordinate conversion unit 220. Thus, in the coordinate conversion unit 220, coordinate conversion is carried out using the corrected rotor angle θc' during not-yet zero learning, and coordinate conversion is carried out using the learned rotor angle θc# after zero learning.

Figure 11:
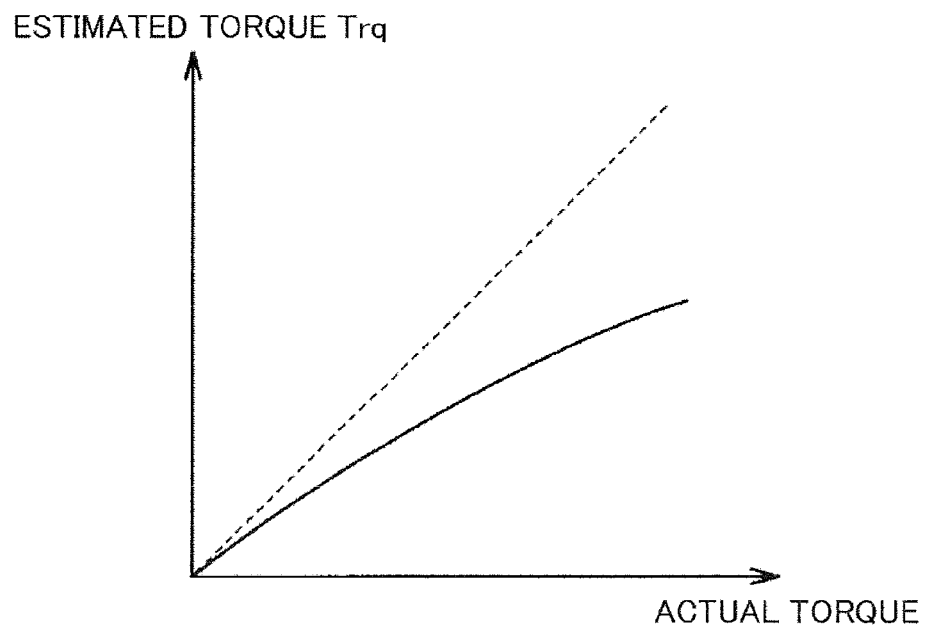
FIG. 11 is a graph that shows the correlation between an actual torque and estimated torque Trq of a motor according to the second embodiment of the invention.
Figure 12:
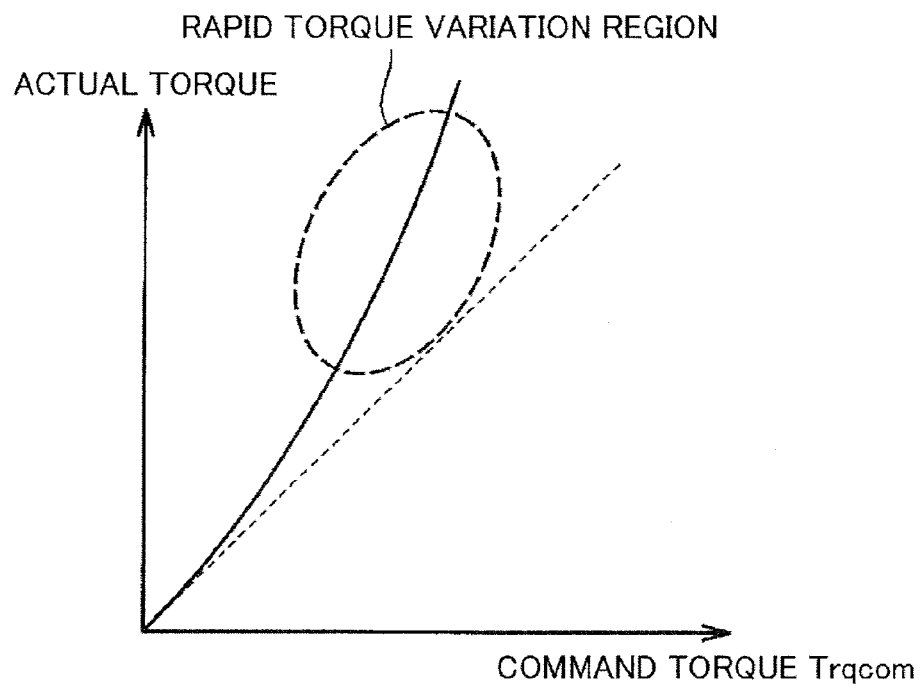
FIG. 12 is a graph that shows the correlation between a command torque Trqcom and an actual torque according to the second embodiment of the invention.

FIG. 11 is a graph that shows an example of the correlation between an actual torque of the motor M1 and an estimated torque Trq that is estimated by the torque estimating unit 420 during not-yet zero learning. FIG. 12 is a graph that shows the correlation between a command torque Trqcom and an actual torque in the case where there is a correlation between an actual torque and an estimated torque Trq as shown in FIG. 11.

As described above, in rectangular-wave voltage control, torque feedback control is executed such that the estimated torque Trq is caused to follow the command torque Trqcom. Therefore, when the estimated torque Trq is calculated so as to be smaller than the actual torque due to the influence of zero error as shown in FIG. 11, the rectangular-wave voltage phase φ is advanced with respect to a proper value through the action of torque feedback control, so the actual torque is excessively larger than the command torque Trqcom as shown in FIG. 12. Such a phenomenon becomes a factor of a rapid torque variation.

On the contrary to the example shown in FIG. 11, when the estimated torque Trq is calculated so as to be larger than the actual torque due to the influence of zero error, the rectangular-wave voltage phase φ is retarded with respect to a proper value through the action of torque feedback control, so the actual torque is smaller than the command torque Trqcom. However, in this case, the actual torque is smaller than the torque required by a user (command torque Trqcom), so a rapid torque variation does not become a significant issue.

During not-yet zero learning, the correction unit 271 corrects the detected rotor position θc by a predetermined angular correction amount θh such that the estimated torque Trq that is estimated by the torque estimating unit 420 is increased.

Specifically, the correction unit 271 determines whether the sign of the command torque Trqcom (which may be the last value of the q-axis current Iq) is positive or negative. When Trqcom≥0, the direction in which the estimated torque Trq increases is a positive direction, so the correction unit 271 calculates the corrected rotor angle θc' by θc'=θc+θh. On the other hand, when Trqcom<0, the direction in which the estimated torque Trq increases is a negative direction, so the correction unit 271 calculates the corrected rotor angle θc' by θc'=θc−θh.

Where the number of pole pairs of the motor M1 is "p" and the number of poles of the resolver 25 is "R", an electric angle θe may be expressed by θe=θc'×p/R. Therefore, the d-axis current Id and the q-axis current Iq that are calculated by the coordinate conversion unit 220 are respectively the following mathematical expressions (1), (2).

$$ID = \sqrt{2} \times \left\{ iu \times \sin\left(\theta e + \frac{2}{3}\pi\right) - iw \times \sin(\theta e) \right\} \quad (1)$$

$$Iq = \sqrt{2} \times \left\{ iu \times \cos\left(\theta e + \frac{2}{3}\pi\right) - iw \times \cos(\theta e) \right\} \quad (2)$$

As described above, in the second embodiment, when rectangular-wave voltage control is executed, the detected rotor position θc is corrected in advance such that the estimated torque Trq is increased while control is allowed in a high torque region during not-yet zero learning. Therefore, an excessive increase in actual torque with respect to the command torque Trqcom is suppressed through the action of torque feedback control in rectangular-wave voltage control.

Therefore, even during not-yet zero learning, it is possible to avoid a rapid variation in output torque while allowing control in a high torque region.

Next, a first alternative embodiment to the second embodiment will be described. In rapid torque variation avoidance control according to the above-described second embodiment, when rectangular-wave voltage control is executed, the detected rotor position θc that is used in coordinate conversion by the coordinate conversion unit 220 is corrected such that the estimated torque Trq is increased during not-yet zero learning.

In contrast to this, in rapid torque variation avoidance control according to the first alternative embodiment, the result of coordinate conversion (the d-axis current Id and the q-axis current Iq) carried out by the coordinate conversion unit 220 is corrected such that the estimated torque Trq is increased.

Figure 13:
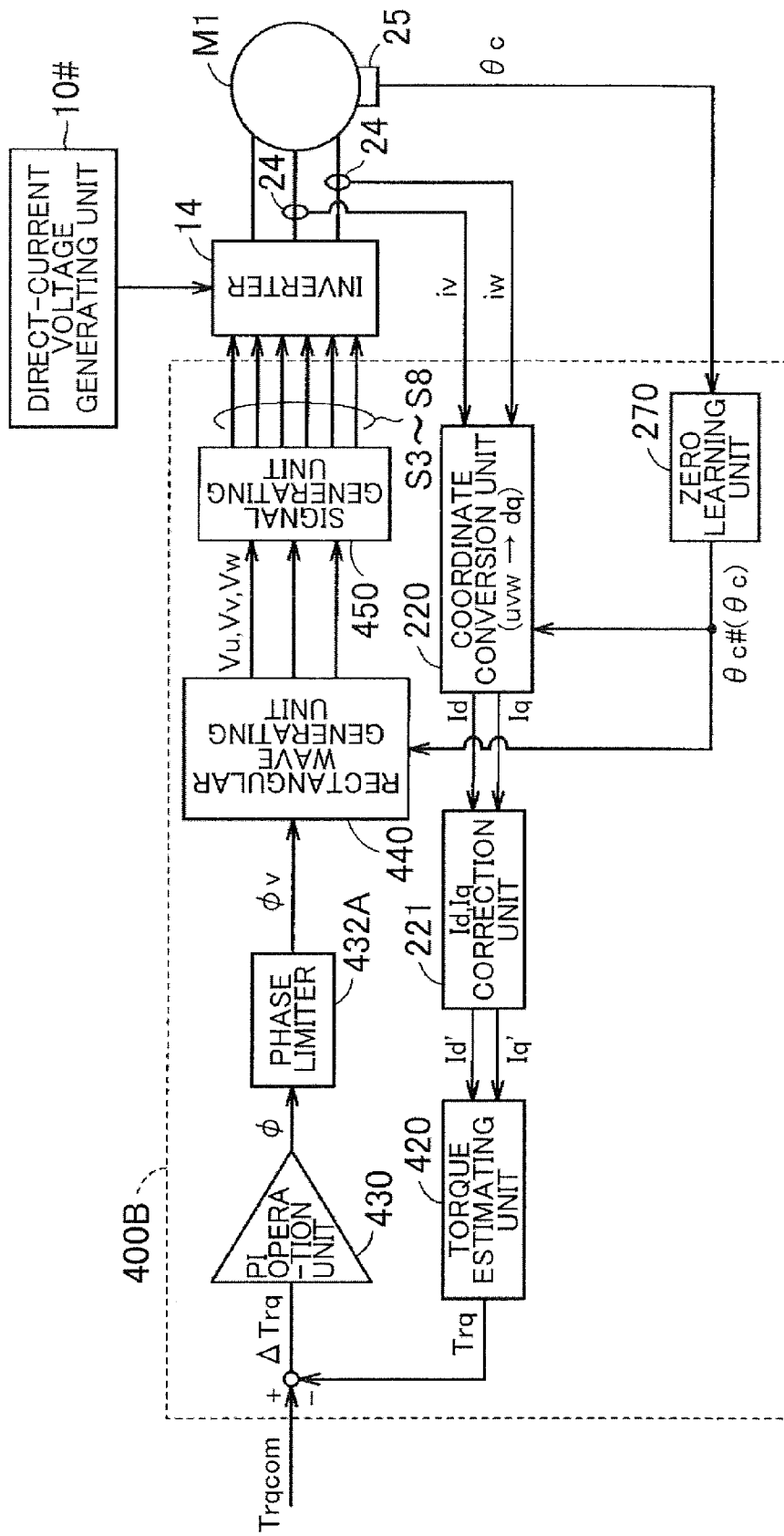
FIG. 13 is a control block diagram of rectangular-wave voltage control according to a first alternative embodiment to the second embodiment of the invention.

Hereinafter, rapid torque variation avoidance control (correcting the d-axis current Id and the q-axis current Iq) according to the first alternative embodiment will be described. FIG. 13 is a control block diagram of rectangular-wave voltage control that is executed by a rectangular-wave voltage control unit 400B according to the first alternative embodiment. The rectangular-wave voltage control unit 400B differs from the rectangular-wave voltage control unit 400A shown in FIG. 10 in that the correction unit 271 is deleted and a correction unit 221 is added. The other functional blocks have been already described, so the detailed description will not be repeated.

During not-yet zero learning, the correction unit 221 corrects the d-axis current Id and the q-axis current Iq, calculated by the coordinate conversion unit 220, using the detected rotor angle θc, and outputs the corrected d-axis current Id and the corrected q-axis current Iq to the torque estimating unit 420 as "corrected d-axis current Id" and "corrected q-axis current Iq'", respectively.

After zero learning, the correction unit 221 directly outputs the d-axis current Id and the q-axis current Iq, calculated by the coordinate conversion unit 220 using the learned rotor angle θc#, to the torque estimating unit 420.

Figure 14:
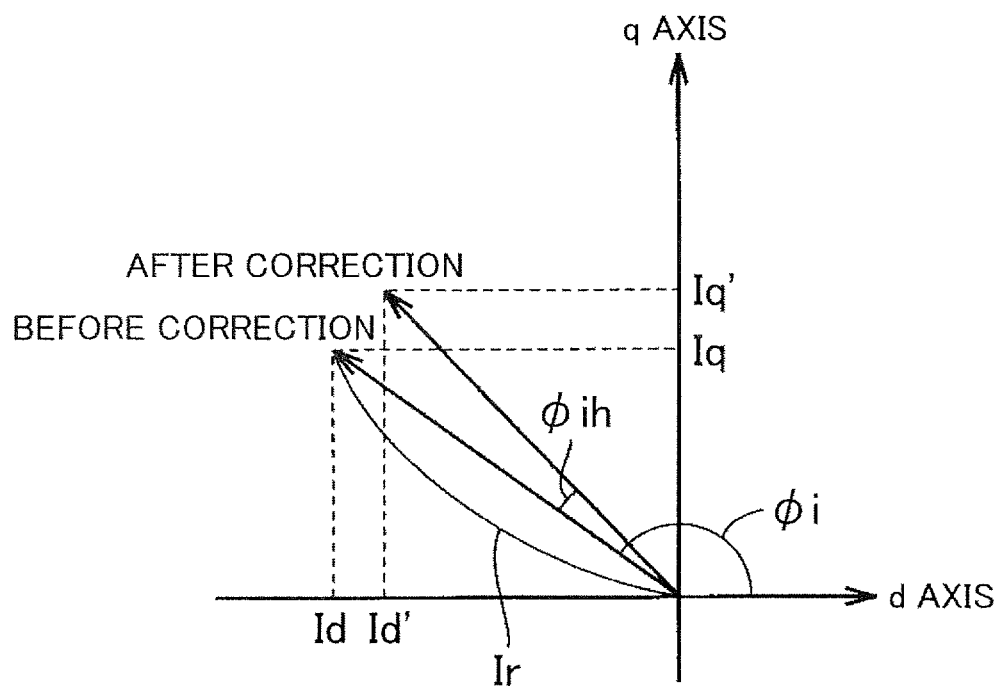
FIG. 14 is a graph for illustrating a technique for correcting a d-axis current Id and a q-axis current Iq according to the first alternative embodiment to the second embodiment of the invention.

FIG. 14 is a view for illustrating a technique for correcting the d-axis current Id and the q-axis current Iq with the use of the correction unit 221. As shown in FIG. 14, where a pre-corrected current phase with reference to the d axis is denoted by "φi", a correction amount of the current phase φi is denoted by "φih" and the square root of $(Iq^2+Id^2)$ is denoted by "Ir", the correction unit 221 calculates the corrected d-axis current Id' and the corrected q-axis current Iq' as follows.

The correction unit 221 determines whether the sign of the command torque Trqcom (which may be the last value of the q-axis current Iq) is positive or negative. When Trqcom≥0, the correction unit 221 calculates the corrected d-axis current Id' and the corrected q-axis current Iq' by Id'=Ir×cos(φi−φih) and Iq'=Ir×sin(φi−φh). On the other hand, when the command torque Trqcom<0, the correction unit 221 calculates the corrected d-axis current Id' and the corrected q-axis current Iq' by Id'=Ir×cos(φi+φh) and Id'=Ir×sin(φi+φih). φi may be expressed by a tan(Iq/Id).

As described above, by correcting the d-axis current Id and the q-axis current Iq such that the estimated torque Trq is increased during not-yet zero learning as well, it is possible to avoid a rapid variation in output torque while control is allowed in a high torque region as in the case of the above-described second embodiment.

Next, a second alternative embodiment to the second embodiment will be described. In rapid torque variation avoidance control according to the above-described second embodiment, when rectangular-wave voltage control is executed, the estimated torque Trq is indirectly increased by correcting the detected rotor position θc during not-yet zero learning. In contrast to this, in rapid torque variation avoidance control according to the second alternative embodiment, the estimated torque Trq is directly increased during not-yet zero learning.

Figure 15:
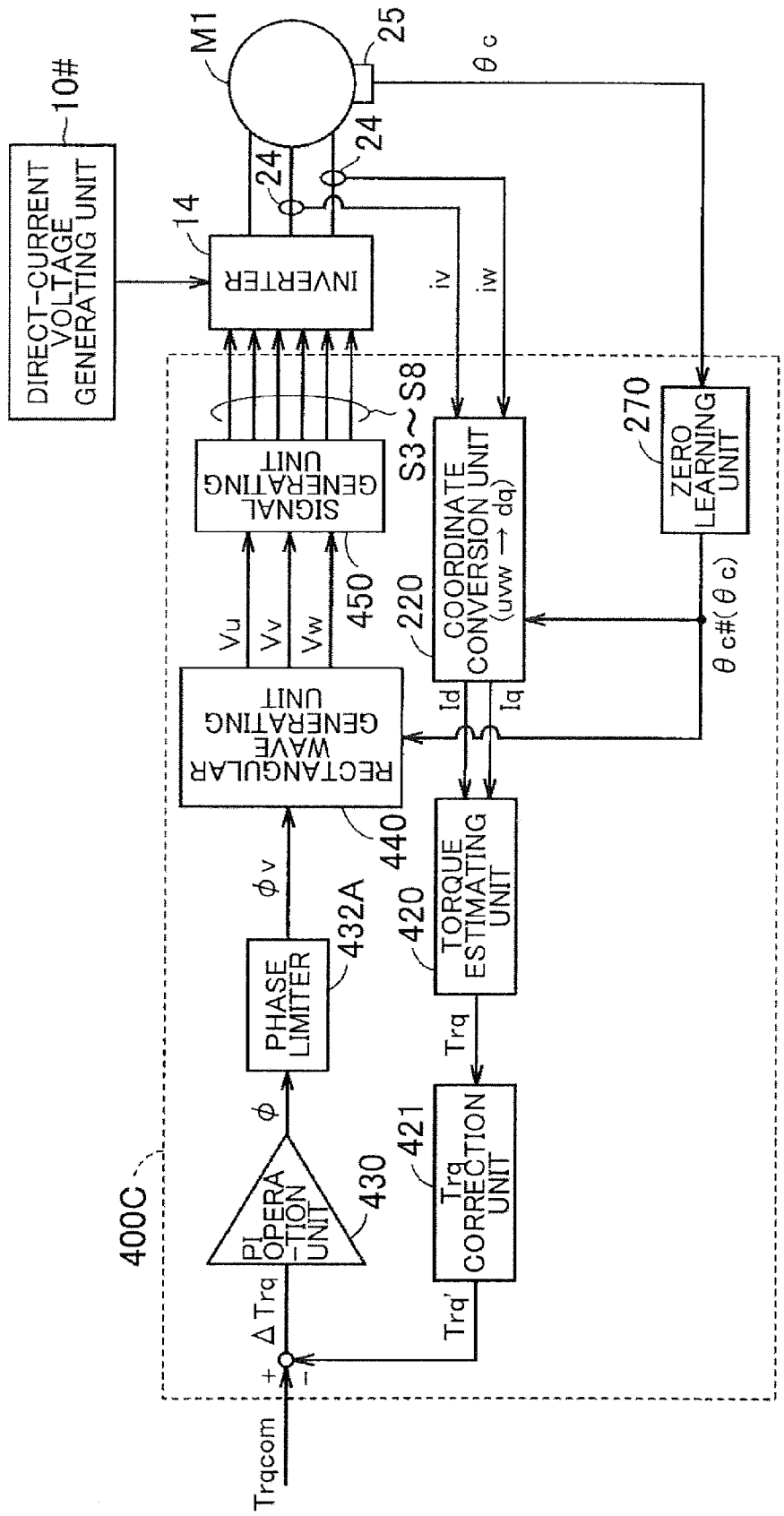
FIG. 15 is a control block diagram of rectangular-wave voltage control according to a second alternative embodiment to the second embodiment of the invention.

Hereinafter, rapid torque variation avoidance control (correcting the estimated torque Trq such that the estimated torque Trq increases) will be described. FIG. 15 is a control block diagram of rectangular-wave voltage control that is executed by a rectangular-wave voltage control unit 400C according to the second alternative embodiment. The rectangular-wave voltage control unit 400C differs from the rectangular-wave voltage control unit 400B shown in FIG. 13 in that the correction unit 221 is deleted and a correction unit 421 is added. The other functional blocks have been already described, so the detailed description will not be repeated.

During not-yet zero learning, the correction unit 421 outputs an estimated torque Trq' obtained as follows. The estimated torque Trq, calculated by the torque estimating unit 420, is corrected by a predetermined value such that the estimated torque Trq increases. During normal times (after zero learning), the correction unit 421 directly outputs the estimated torque Trq calculated by the torque estimating unit 420.

In this way, by directly correcting the estimated torque Trq such that the estimated torque Trq increases during not-yet zero learning as well, it is possible to avoid a rapid variation in output torque while control is allowed in a high torque region as in the case of the above-described second embodiment.

Next, a third alternative embodiment to the second embodiment will be described. In rapid torque variation avoidance control according to the above-described second embodiment, when rectangular-wave voltage control is executed, a rapid torque variation is avoided by correcting the detected rotor position θc in advance such that the estimated torque Trq is increased during not-yet zero learning. In contrast to this, in rapid torque variation avoidance control according to the third alternative embodiment, a rapid torque variation is avoided by directly limiting the rate of change in the command torque Trqcom during not-yet zero learning.

Figure 16:
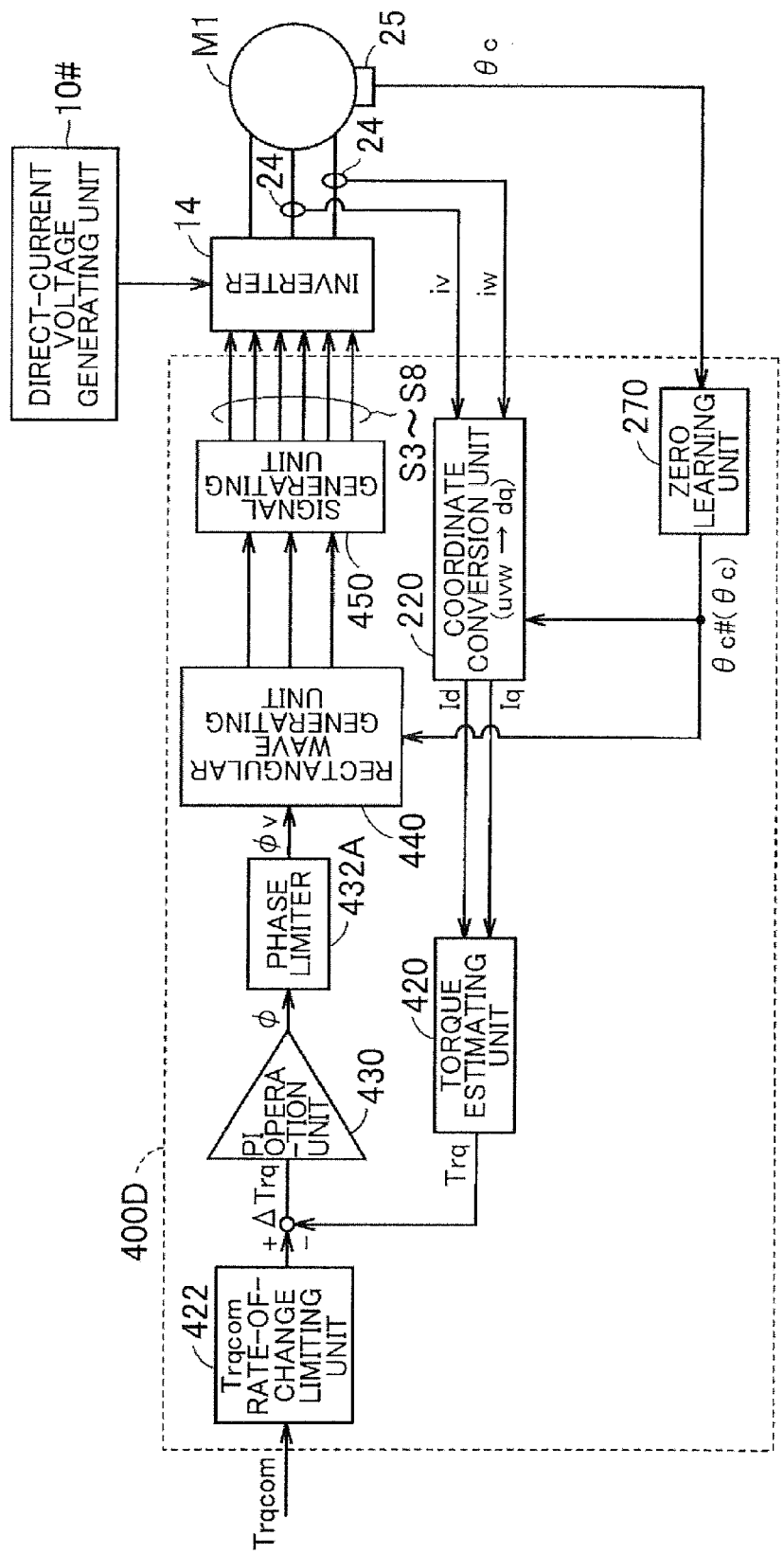
FIG. 16 is a control block diagram of rectangular-wave voltage control according to a third alternative embodiment to the second embodiment of the invention.

Hereinafter, rapid torque variation avoidance control (limiting the rate of change in the command torque Trqcom) according to the third alternative embodiment will be described. FIG. 16 is a control block diagram of rectangular-wave voltage control that is executed by a rectangular-wave voltage control unit 400D according to the third alternative embodiment. The rectangular-wave voltage control unit 400D differs from the rectangular-wave voltage control unit 400A shown in FIG. 10 in that the correction unit 271 is deleted and a limiting unit 422 is added. The other functional blocks have been already described, so the detailed description will not be repeated.

During not-yet zero learning, the rate-of-change limiting unit 422 limits the rate of change in the command torque Trqcom that is used in rectangular-wave voltage control to below a predetermined value. During normal times (after zero learning), the rate-of-change limiting unit 422 does not limit the rate of change in the command torque Trqcom that is used in rectangular-wave voltage control to below the predetermined value. Thus, it is possible to directly suppress a rapid torque variation during not-yet zero learning.

While the invention has been described with reference to example embodiments thereof, it is to be understood that the invention is not limited to the described example embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A vehicle comprising:
   a motor having a rotor;
   a resolver configured to detect a rotation angle of the rotor; and
   a control device configured to execute rectangular-wave control over the motor using the rotation angle of the rotor, the rotation angle being detected by the resolver, the control device being configured to execute zero learning for learning a deviation between an origin of an actual rotation angle of the rotor and an origin of the detected rotation angle of the rotor and then correct the detected rotation angle of the rotor on the basis of a result of the zero learning, and the control device being configured to execute avoidance control for avoiding a rapid variation in output of the motor when the zero learning has not been completed yet,
   wherein the control device is configured to calculate an estimated torque of the motor using the detected rotation angle of the rotor and then execute feedback control over the motor on the basis of a deviation between the estimated torque and a command torque of the motor when the rectangular-wave control is executed, the control device is configured to set an upper limit of the command torque during the rectangular-wave control to a first line after the zero learning has been completed, and the avoidance control is control for decreasing the upper limit of the command torque during the rectangular-wave control to below the first line.

2. The vehicle according to claim 1, wherein
   the control device is configured to set a control range of a rectangular-wave voltage phase that is used in the rectangular-wave control to a first range after the zero learning has been completed, and the avoidance control is control for limiting the control range of the rectangular-wave voltage phase as compared to the first range.

3. A vehicle comprising:
   a motor having a rotor;
   a resolver configured to detect a rotation angle of the rotor; and
   a control device configured to execute rectangular-wave control over the motor using the rotation angle of the rotor, the rotation angle being detected by the resolver, the control device being configured to execute zero learning for learning a deviation between an origin of an actual rotation angle of the rotor and an origin of the detected rotation angle of the rotor and then correct the detected rotation angle of the rotor on the basis of a result of the zero learning, and the control device being configured to execute avoidance control for avoiding a rapid variation in output of the motor when the zero learning has not been completed yet, wherein
   the avoidance control is control for prohibiting execution of the rectangular-wave control over the motor.

4. A vehicle comprising:
   a motor having a rotor;
   a resolver configured to detect a rotation angle of the rotor; and
   a control device configured to execute rectangular-wave control over the motor using the rotation angle of the rotor, the rotation angle being detected by the resolver, the control device being configured to execute zero learning for learning a deviation between an origin of an actual rotation angle of the rotor and an origin of the detected rotation angle of the rotor and then correct the detected rotation angle of the rotor on the basis of a result of the zero learning, and the control device being configured to execute avoidance control for avoiding a rapid variation in output of the motor when the zero learning has not been completed yet, wherein
   the control device is configured to calculate an estimated torque of the motor using the detected rotation angle of the rotor and then execute feedback control over the motor on the basis of a deviation between the estimated torque and a command torque of the motor when the rectangular-wave control is executed, and the avoidance control is control for correcting the detected rotation angle of the rotor such that the estimated torque is increased, the detected rotation angle being used to calculate the estimated torque.

5. A vehicle comprising:
   a motor having a rotor;
   a resolver configured to detect a rotation angle of the rotor; and
   a control device configured to execute rectangular-wave control over the motor using the rotation angle of the rotor, the rotation angle being detected by the resolver, the control device being configured to execute zero learning for learning a deviation between an origin of an actual rotation angle of the rotor and an origin of the detected rotation angle of the rotor and then correct the detected rotation angle of the rotor on the basis of a result of the zero learning, and the control device being configured to execute avoidance control for avoiding a rapid variation in output of the motor when the zero learning has not been completed yet, wherein
   the control device is configured to calculate an estimated torque of the motor using the detected rotation angle of the rotor and then execute feedback control over the motor on the basis of a deviation between the estimated torque and a command torque of the motor when the rectangular-wave control is executed, and the avoidance control is control for correcting the estimated torque to increase the estimated torque, the estimated torque being calculated using the detected rotation angle of the rotor.

6. The vehicle according to claim 5, wherein
   the avoidance control is control for indirectly correcting the estimated torque to increase the estimated torque by correcting the detected rotation angle.

7. The vehicle according to claim 5, wherein
   the avoidance control is control for directly correcting the estimated torque to increase the estimated torque by increasing the estimated torque by a predetermined value.

8. A vehicle comprising:
   a motor having a rotor;
   a resolver configured to detect a rotation angle of the rotor; and
   a control device configured to execute rectangular-wave control over the motor using the rotation angle of the rotor, the rotation angle being detected by the resolver, the control device being configured to execute zero learning for learning a deviation between an origin of an actual rotation angle of the rotor and an origin of the detected rotation angle of the rotor and then correct the detected rotation angle of the rotor on the basis of a result of the zero learning, and the control device being configured to execute avoidance control for avoiding a rapid variation in output of the motor when the zero learning has not been completed yet, wherein
the control device is configured to calculate an estimated torque of the motor using the detected rotation angle of the rotor and then execute feedback control over the motor on the basis of a deviation between the estimated torque and a command torque of the motor when the rectangular-wave control is executed, and the avoidance control is control for limiting a rate of change in the command torque to below a predetermined value.

9. A control method for a vehicle including:
a motor having a rotor; and
a resolver configured to detect a rotation angle of the rotor, the control method comprising:
detecting the rotation angle of the rotor with the use of the resolver;
executing rectangular-wave control over the motor using the detected rotation angle;
executing zero learning for learning a deviation between an origin of an actual rotation angle of the rotor and an origin of the detected rotation angle of the rotor;
correcting the detected rotation angle of the rotor on the basis of a result of the zero learning; and
executing avoidance control for avoiding a rapid variation in output of the motor when the zero learning has not been completed yet, wherein:
an estimated torque of the motor is calculated using the detected rotation angle of the rotor and then feedback control is executed over the motor on the basis of a deviation between the estimated torque and a command torque of the motor when the rectangular-wave control is executed;
an upper limit of the command torque during the rectangular-wave control is set to a first line after the zero learning has been completed; and
in the avoidance control, the upper limit of the command torque during the rectangular-wave control is decreased to below the first line.

10. The control method according to claim 9, wherein:
a control range of a rectangular-wave voltage phase that is used in the rectangular-wave control is set to a first range after the zero learning has been completed; and
in the avoidance control, the control range of the rectangular-wave voltage phase is limited as compared to the first range.

11. A control method for a vehicle including:
a motor having a rotor; and
a resolver configured to detect a rotation angle of the rotor, the control method comprising:
detecting the rotation angle of the rotor with the use of the resolver;
executing rectangular-wave control over the motor using the detected rotation angle;
executing zero learning for learning a deviation between an origin of an actual rotation angle of the rotor and an origin of the detected rotation angle of the rotor;
correcting the detected rotation angle of the rotor on the basis of a result of the zero learning; and
executing avoidance control for avoiding a rapid variation in output of the motor when the zero learning has not been completed yet, wherein:
any one of the rectangular-wave control and a pulse width modulation control is executed over the motor; and
in the avoidance control, execution of the rectangular-wave control over the motor is prohibited.

12. A control method for a vehicle including:
a motor having a rotor; and
a resolver configured to detect a rotation angle of the rotor, the control method comprising:
detecting the rotation angle of the rotor with the use of the resolver;
executing rectangular-wave control over the motor using the detected rotation angle;
executing zero learning for learning a deviation between an origin of an actual rotation angle of the rotor and an origin of the detected rotation angle of the rotor;
correcting the detected rotation angle of the rotor on the basis of a result of the zero learning; and
executing avoidance control for avoiding a rapid variation in output of the motor when the zero learning has not been completed yet, wherein:
an estimated torque of the motor is calculated using the detected rotation angle of the rotor and then feedback control is executed over the motor on the basis of a deviation between the estimated torque and a command torque of the motor when the rectangular-wave control is executed; and
in the avoidance control, the detected rotation angle of the rotor is corrected such that the estimated torque is increased, the detected rotation angle being used to calculate the estimated torque.

13. A control method for a vehicle including:
a motor having a rotor; and
a resolver configured to detect a rotation angle of the rotor, the control method comprising:
detecting the rotation angle of the rotor with the use of the resolver;
executing rectangular-wave control over the motor using the detected rotation angle;
executing zero learning for learning a deviation between an origin of an actual rotation angle of the rotor and an origin of the detected rotation angle of the rotor;
correcting the detected rotation angle of the rotor on the basis of a result of the zero learning; and
executing avoidance control for avoiding a rapid variation in output of the motor when the zero learning has not been completed yet, wherein:
an estimated torque of the motor is calculated using the detected rotation angle of the rotor and then feedback control is executed over the motor on the basis of a deviation between the estimated torque and a command torque of the motor when the rectangular-wave control is executed; and
in the avoidance control, the estimated torque is corrected to increase the estimated torque, the estimated torque being calculated using the detected rotation angle of the rotor.

14. The control method according to claim 13, wherein in the avoidance control, the estimated torque is indirectly corrected to increase the estimated torque by correcting the detected rotation angle.

15. The control method according to claim 13, wherein in the avoidance control, the estimated torque is directly corrected to increase the estimated torque by increasing the estimated torque by a predetermined value.

16. A control method for a vehicle including:
a motor having a rotor; and
a resolver configured to detect a rotation angle of the rotor, the control method comprising:
detecting the rotation angle of the rotor with the use of the resolver;

executing rectangular-wave control over the motor using the detected rotation angle;

executing zero learning for learning a deviation between an origin of an actual rotation angle of the rotor and an origin of the detected rotation angle of the rotor;

correcting the detected rotation angle of the rotor on the basis of a result of the zero learning; and executing avoidance control for avoiding a rapid variation in output of the motor when the zero learning has not been completed yet, wherein:

an estimated torque of the motor is calculated using the detected rotation angle of the rotor and then feedback control is executed over the motor on the basis of a deviation between the estimated torque and a command torque of the motor when the rectangular-wave control is executed; and in the avoidance control, a rate of change in the command torque is limited to below a predetermined value.

* * * * *